US012608549B2

(12) United States Patent
Singh et al.

(10) Patent No.: US 12,608,549 B2
(45) Date of Patent: Apr. 21, 2026

(54) TRAINING MACHINE LEARNING MODELS FOR MULTI-MODAL ENTITY MATCHING IN ELECTRONIC RECORDS

(71) Applicant: Salesforce, Inc., San Francisco, CA (US)

(72) Inventors: Akash Singh, Gurugram (IN); Rajdeep Dua, Hyderabad (IN); Arun Kumar Jagota, Sunnyvale, CA (US)

(73) Assignee: Salesforce, Inc.

( * ) Notice: Subject to any disclaimer, the term of this patent is extended or adjusted under 35 U.S.C. 154(b) by 855 days.

(21) Appl. No.: 17/952,155

(22) Filed: Sep. 23, 2022

(65) Prior Publication Data

US 2024/0020479 A1 Jan. 18, 2024

(30) Foreign Application Priority Data

Jul. 15, 2022 (IN) .............................. 202241040689

(51) Int. Cl.
| | |
|---|---|
| *G06F 40/295* | (2020.01) |
| *G06F 40/284* | (2020.01) |
| *G06N 3/063* | (2023.01) |
| *G06N 3/084* | (2023.01) |

(52) U.S. Cl.
CPC .......... *G06F 40/295* (2020.01); *G06F 40/284* (2020.01); *G06N 3/063* (2013.01); *G06N 3/084* (2013.01)

(58) Field of Classification Search
CPC .... G06F 40/295; G06F 40/284; G06F 40/216; G06N 3/063; G06N 3/084; G06N 3/09; G06N 3/045
See application file for complete search history.

(56) References Cited

U.S. PATENT DOCUMENTS

| | | | | |
|---|---|---|---|---|
| 10,838,995 B2 * | 11/2020 | Zhuang | .............. | G06F 16/9535 |
| 11,574,028 B2 * | 2/2023 | Andreica | ............ | G06F 16/9562 |
| 2007/0067285 A1 * | 3/2007 | Blume | ................... | G06Q 10/10 |
| | | | | 707/999.005 |

(Continued)

FOREIGN PATENT DOCUMENTS

| | | | | |
|---|---|---|---|---|
| WO | WO-2023065635 A1 * | 4/2023 | ............. | G06N 3/084 |

OTHER PUBLICATIONS

Li, Jing, et al. "A survey on deep learning for named entity recognition." IEEE transactions on knowledge and data engineering 34.1 (2020): 50-70. (Year: 2020).*

(Continued)

*Primary Examiner* — James T Tsai
(74) *Attorney, Agent, or Firm* — Ingrassia Fisher & Lorenz, LLP

(57) ABSTRACT

A cloud platform trains a machine-learned entity matching model that generates predictions on whether a pair of electronic records refer to a same entity. In one embodiment, the entity matching model is configured as a transformer architecture. In one instance, the entity matching model is trained using a combination of a first loss and a second loss. The first loss indicates a difference between an entity matching prediction for a training instance and a respective match label for the training instance. The second loss indicates a difference between a set of named-entity recognition (NER) predictions for the training instance and the set of NER labels for the tokens of the training instance.

18 Claims, 5 Drawing Sheets

(56) References Cited

U.S. PATENT DOCUMENTS

| 2021/0073247 A1* | 3/2021 | Zamfir | G06N 5/01 |
| 2023/0044266 A1* | 2/2023 | Nguyen | G06F 16/90335 |

OTHER PUBLICATIONS

Ashish Vaswani, et al. 2017. Attention is all you need. In Proceedings of the 31st International Conference on Neural Information Processing Systems (NIPS'17). (Year: 2017).*

* cited by examiner

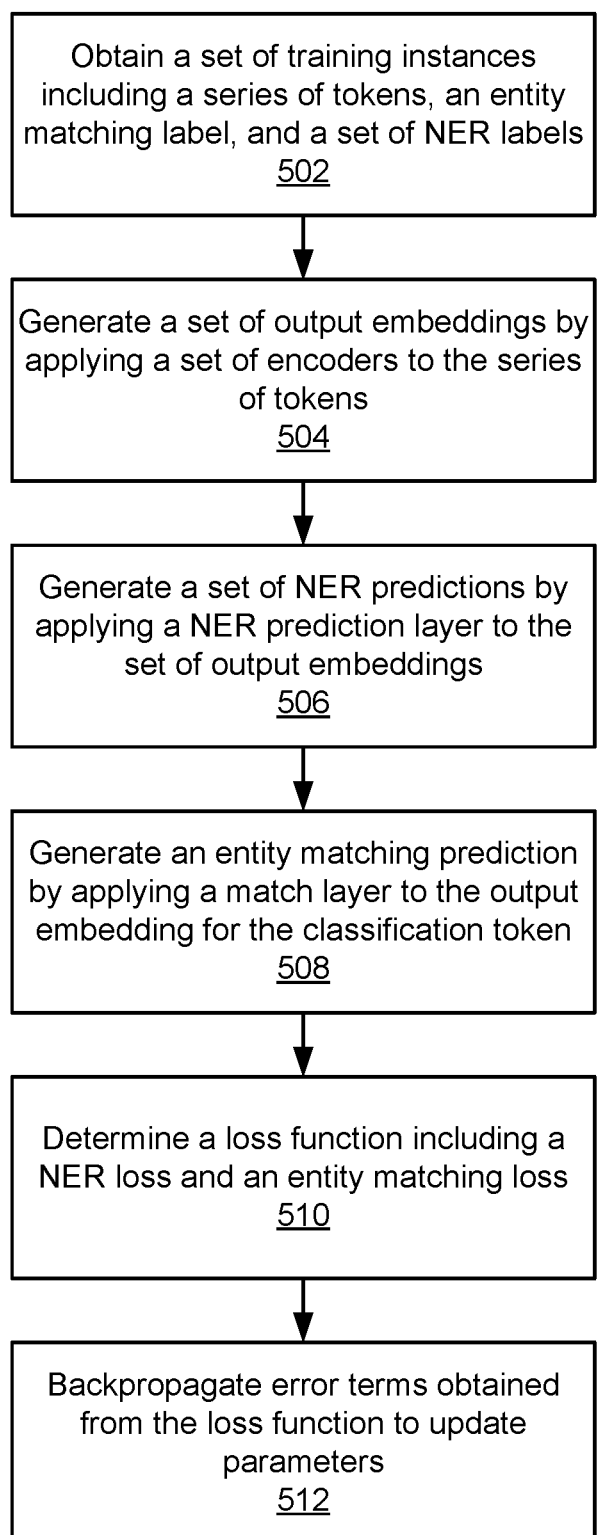

Obtain a set of training instances
including a series of tokens, an entity
matching label, and a set of NER labels
502

Generate a set of output embeddings by
applying a set of encoders to the series
of tokens
504

Generate a set of NER predictions by
applying a NER prediction layer to the
set of output embeddings
506

Generate an entity matching prediction
by applying a match layer to the output
embedding for the classification token
508

Determine a loss function including a
NER loss and an entity matching loss
510

Backpropagate error terms obtained
from the loss function to update
parameters
512

FIG. 5

TRAINING MACHINE LEARNING MODELS FOR MULTI-MODAL ENTITY MATCHING IN ELECTRONIC RECORDS

CROSS-REFERENCE TO RELATED APPLICATIONS

This application claims priority to Indian provisional patent application no. 202241040689, filed on Jul. 15, 2022, in the Indian Patent Office, which is incorporated herein by reference in its entirety.

BACKGROUND

This disclosure generally relates to entity matching, and more specifically to entity matching using machine-learned models.

Cloud platforms store and manage data for many organizations, such as enterprises, across different platforms. A cloud platform may be configured as a multi-tenant architecture for serving different organizations. In particular, a cloud platform may deploy applications for the organizations on different products of the cloud platform. However, because of divisions such as business units, verticals, market dynamics, time-to-market, geographics, these applications run across multiple instances and across multiple tenants of the cloud platform. Each tenant may be logically separated from other tenants and may operate its own data model with a combination of standard and custom objects. Moreover, even within one tenancy, data belonging to different business units, verticals, and geographics may be stored using different data models for an organization. Thus, a cloud platform may store information about the same entity across different applications, data models, and databases in a disconnected manner. There is significant overhead spent on translating and connecting data for entities.

BRIEF DESCRIPTION OF THE DRAWINGS

FIG. 5 is a flowchart illustrating a method of training the entity matching model, in accordance with an embodiment.

Figure 1:
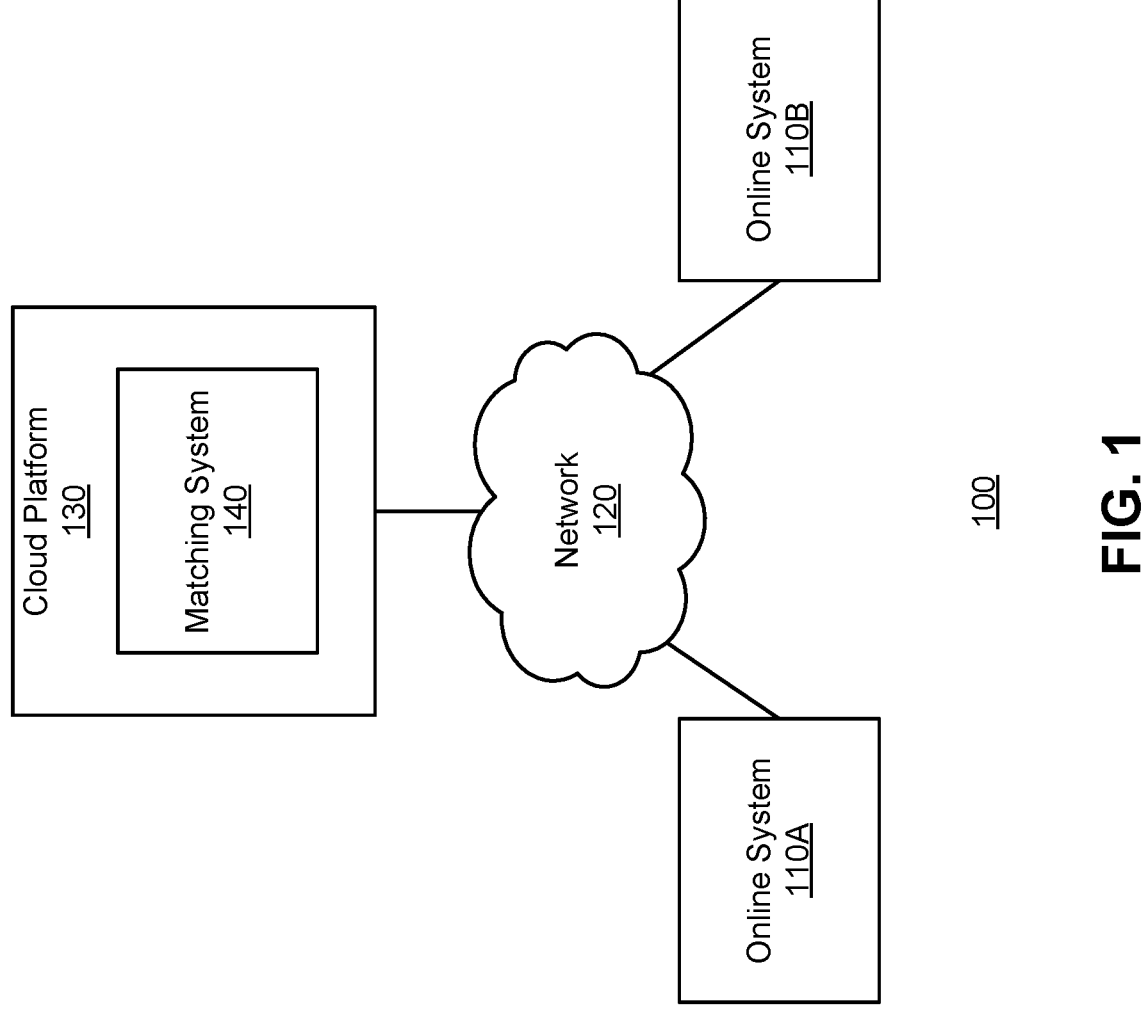
FIG. 1 is a block diagram of a system environment including a cloud platform and one or more online systems, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

The figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "client device 110" in the text refers to reference numerals "client device 110A" and/or "client device 110B" in the figures).

DETAILED DESCRIPTION

Overview

A cloud platform trains a machine-learned entity matching model that generates predictions on whether a pair of electronic records refer to a same entity. In one embodiment, the entity matching model is configured as a transformer architecture. In one instance, the entity matching model is trained using a combination of a first loss and a second loss. The first loss indicates a difference between an entity matching prediction for a training instance and a respective match label for the training instance. The second loss indicates a difference between a set of named-entity recognition (NER) predictions for the training instance and the set of NER labels for the tokens of the training instance.

Even though the NER predictions generated by the entity matching model may not be used during the inference process, the second loss as a NER loss allows the entity matching model to identify different types of entities in the electronic records and is significantly useful for entity matching. Specifically, by training the entity matching model with the joint loss function, the NER loss allows the entity matching model to learn relationships between different entity types, use contextual information and allow the entity matching model to distinguish between similar and different entities.

System Environment

FIG. 1 is a block diagram of a system environment 100 including a cloud platform 130 and one or more online systems 110, in accordance with an embodiment. The system environment 100 shown in FIG. 1 comprises a cloud platform 130, one or more online systems 110A, 110B, and a network 120. In alternative configurations, different and/or additional components may be included in the system environment 100.

The cloud platform 130 provide computing resources, such as storage, computing resources, applications, and the like to online systems 110 on an on-demand basis via the network 120 such as internet. The cloud platform 130 allows organizations, such as large-scale enterprises, to reduce upfront costs to set up computing infrastructure and also allows the organizations to deploy applications up and running faster with less maintenance overhead. The cloud platform 130 may also allow the organizations to adjust computing resources to rapidly fluctuating and unpredictable demands. The organizations can create data centers using instances of the cloud platform 130 for use by users of the organization.

In one embodiment, the cloud platform 130 may be configured as a multi-tenant architecture for multiple tenancies. Each tenant may be associated with an organization, such as an enterprise that is a customer of the cloud platform 130, a subsidiary of the organization, or different organizational units of the organization. Although not shown in FIG. 1, each tenant may have multiple users that interact with the cloud platform 130 through client devices. Within the multi-tenant architecture, data for multiple tenants may be stored in the same physical database. However, the database is configured such that data of one tenant is kept logically separate from that of other tenants.

The cloud platform 130 may deploy a significant number of services and applications for an organization using, for example, different products of the cloud platform 130. However, because of divisions such as business units, verticals, market dynamics, geographics, and the like, the services and applications may run across multiple instances and across multiple tenancies of the cloud platform 130. Thus, the cloud platform 130 may store information about a same entity, such as businesses, persons, contacts, across different applications, data models, and data modalities in a disconnected manner.

For example, a first application of an enterprise organization may store information describing account "ABC, Inc." in a first electronic record using a first data model, and a second application of the enterprise organization may store information on the same corporation in a second electronic record using a second data model that is different from the first data model. As another example, references to the same entity may occur across different modalities of data, such as structured data including database tables, and unstructured data including text documents, web pages, and the like. As yet another example, different organizational units (e.g., sales, application developers, marketing, etc.) of an enterprise may engage with the same vendor but with different points of contact within the vendor. Thus, each organization unit of the enterprise may store records on the vendor but in different data formats and contact information. Thus, there is significant overhead spent on translating and connecting data for entities.

Thus, in one embodiment, the cloud platform 130 includes a matching system 140 that trains an entity matching model that generates entity matching predictions on whether a pair of input texts refer to the same entity. An entity can refer to any distinct, independent presence and may refer to, for example, a location, organization, person, contact information (e.g., phone number, address, city), account name (e.g., business account of customer), product, and the like. Specifically, the matching system 140 trains the parameters of the entity matching model using a combination of a first loss and a second loss. The first loss indicates a difference between an entity matching prediction for a training instance and a respective entity matching label for the training instance. The second loss indicates a difference between a set of named-entity recognition (NER) predictions for the training instance and the set of NER labels for the tokens of the training instance.

In one embodiment, the matching system 140 obtains collections of electronic records including, for example, database tables, web pages, text documents, application data, and the like from various sources of the cloud platform 130. The matching system 140 may process the electronic records to divide the text of the records into one or more processing units, including sentences, paragraphs, and the like. In one embodiment, the matching system 140 performs a blocking process on the electronic records before pairs of records are input to the entity matching model. Often times, it is computationally infeasible to perform a pairwise comparison of all processing units of text. Thus, the blocking process reduces the pairs to match by applying a set of rules and heuristics to identify blocks of records.

For each block, the matching system 140 inputs pairs of input text (e.g., processing units identified from the electronic records) to the entity matching model to generate entity matching predictions for the pair. The matching system 140 determines that select pairs of input text that have entity matching predictions above a predetermine threshold describe the same entity. For example, a first input text may describe a vendor entity with a set of first contacts and a second input text may describe the same vendor but with a set of second contacts. In one instance, the electronic records of the select pairs of input text may be merged such that the information in the different electronic records of the same entity are included in the same record. For example, the pair of records describing the same vendor entity (and other records on the same vendor entity) may be merged together into one record and including all points of contact that are known to the organizational units of the enterprise. In this manner, an organization can significantly reduce redundancies and duplicates in electronic records while obtaining a comprehensive view of entity information.

Figure 2:
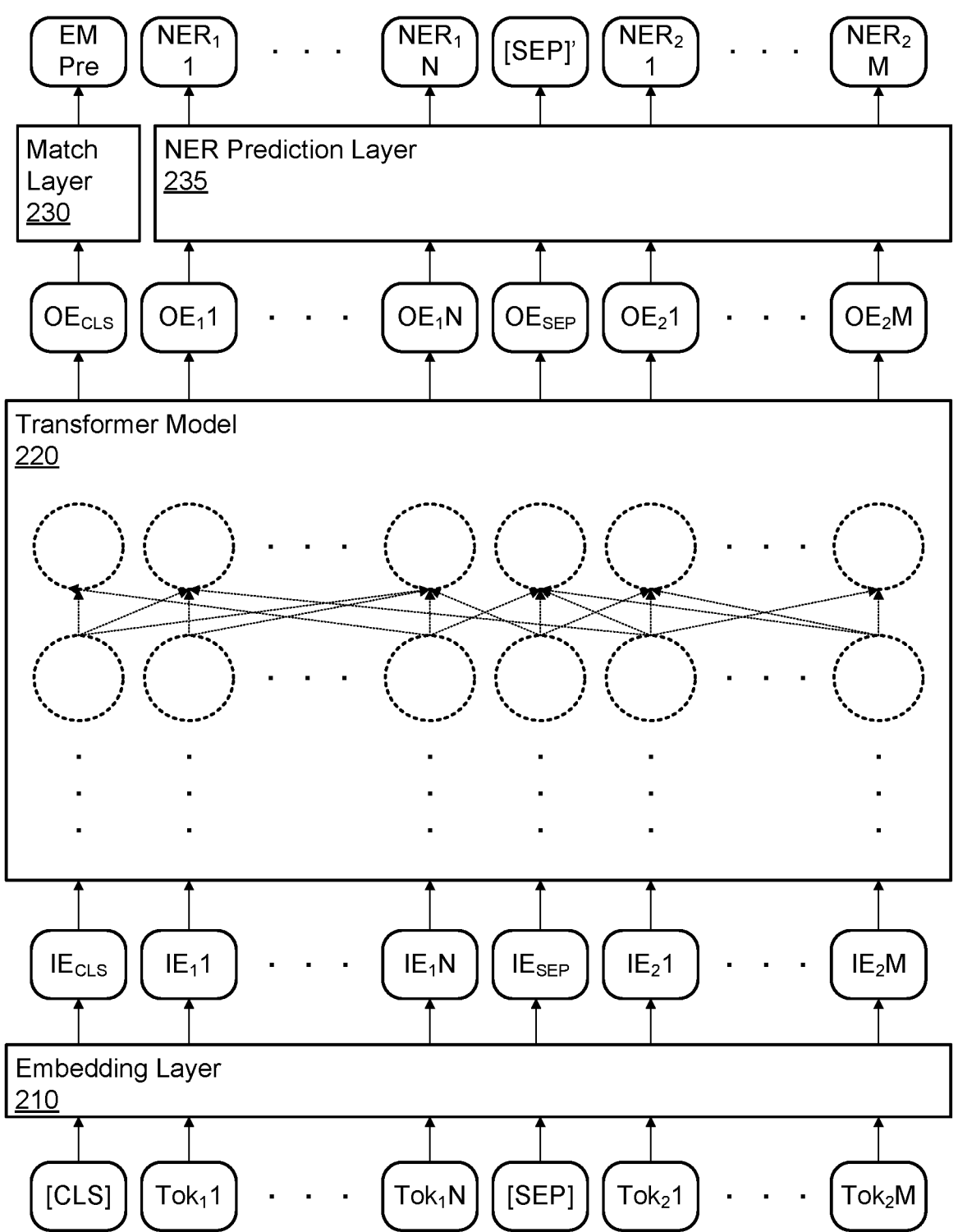
FIG. 2 illustrates an inference process for using a machine-learned entity matching model to generate entity matching predictions, in accordance with an embodiment.

FIG. 2 illustrates an inference process for using a machine-learned entity matching model to generate entity matching predictions, in accordance with an embodiment. Specifically, FIG. 2 illustrates an entity matching model that has been trained by the matching system 140. In one embodiment, the entity matching model includes an embedding layer 210, a transformer model 220, a NER prediction layer 235, and a match layer 230. The entity matching model is configured to receive a pair of input text including at least a first input text and a second input text and generate an entity matching prediction that indicates a likelihood the first input text and the second input text describe the same entity.

In one embodiment, portions of or the entire entity matching model are configured as a neural network including a plurality of layers of nodes and is associated with a set of parameters. For example, portions of the entity matching model may be configured as a transformer model that includes a plurality of encoders or decoders each including one or more attention layers. Each attention layer may be configured to receive a query, a key, and a value and generate one or more attention scores that are fed to other layers of the neural network. As another example, portions of the entity matching model may be configured as deep neural networks (DNN), convolutional neural networks (CNN), recurrent neural networks (RNN), long short-term memory networks (LSTM), or any combination thereof.

For example, a pair of input text may describe the same entity, account "ABC, Inc." The first input text is "Account ABC Inc operates in the database industry. It is located at 123 Oak Avenue, LA, California. It has contacts John A. Smith, Jane Palmer." The second input text is "Account ABC, Inc. operates in the software industry. Its contacts are John Smith and Jane Van Palmer. It is listed at 123 Oak Avenue, Los Angeles." Entity matching is a non-trivial problem as different records of the cloud platform 130 can refer to a same entity with significant variations. For example, the name of the account is referred to as "ABC Inc" in the first input text, while the name of the account is referred to as "ABC, Inc." the second input text. As another example, the first input text describes the address of the account and then the contact persons for the account, while the second input text describes the contact persons for the account and then the address of the account. The entity matching model generates a likelihood (e.g., 0.97) that indicates whether the first input text and second input text describe the same entity.

During the inference process, the matching system 140 selects a pair of input text. The first input text may be, for example, from a different source than the second input text. The matching system 140 generates a series of tokens from the pair of input text. The series of tokens includes at least a first series of tokens from the first input text and a second series of tokens from the second input text. Specifically, a token may encode a respective word, phrase, character, or any type of text unit. For example, a token for a particular word may be represented by a dense vector that includes a number of elements each with a respective value. As another example, a token for a particular word may be represented by a vector that includes a set of elements each corresponding to a respective word, and in which the element corresponding to the particular word is a non-zero value and the remaining elements are zero. In one instance, the matching system 140 generates the series of tokens by placing a classification token [CLS] as the initial token and a separation token [SEP] between the first input text and the second input text.

The embedding layer 210 is configured to receive a set of tokens and generate a set of input embeddings. Specifically, the embedding layer 210 is configured to receive a first token that is the classification token [CLS], a first set of N tokens $Tok_11, \ldots, Tok_1N$ that are tokens reserved for a first input text, a separation token [SEP], and a second set of M tokens $Tok_21, \ldots, Tok_2M$ that are tokens reserved for a second input text for a pair of input texts. For example, for the example first input text starting with "Account ABC Inc operates in the database," the value for token $Tok_11$ represents the word "Account," the value for token $Tok_12$ represents the word "ABC," the value for token $Tok_13$ represents the word "Inc," and so on. When the length of tokens for the first input text is smaller than N or the length of tokens for the second input text is smaller than M, the remaining tokens may be set to zero. As described in further detail below in conjunction with the training process, any extra vectors in the set of tokens are masked by multiplying the tokens with zeros and thus, are not part of the backpropagation process to update the parameters. The embedding layer 210 generates an input embedding $IE_{CLS}$ for the [CLS] token, a first set of N input embeddings $IE_11, \ldots, IE_1N$ for the first set of tokens, an input embedding for the [SEP] token, and a second set of M input embeddings $IE_21, \ldots, IE_2M$ for the second set of tokens.

The transformer model 220 is configured to receive the set of input embeddings and generate a set of output embeddings. In one embodiment, the transformer model 220 includes a set of attention layers and is configured as a "bidirectional encoder representations from transformers" (BERT) model. The set of output embeddings includes an output embedding $OE_{CLS}$ for the [CLS] token, a first set of N output embeddings $OE_11, \ldots, OE_1N$ for the first set of tokens, an output embedding for the [SEP] token, and a second set of M output embeddings $OE_21, \ldots, OE_2M$ for the second set of tokens. In one instance, an output embedding for a respective token may correspond to a representation of the token in a latent space. For example, the first output embedding $OE_11$ may be an embedding of the first token $Tok_11$ of the first input text, and so on. However, the output embedding $OE_{CLS}$ for the [CLS] token may be an embedding representing the series of tokens input to the entity matching model as a whole.

The NER prediction layer 235 is configured to receive the first set of output embeddings and the second set of output embeddings and generate a set of NER predictions for the series of tokens. The set of NER predictions may include a NER prediction for each token in the series of tokens. A NER prediction indicates the type of entity the token or a phrase including token belongs to. The set of NER predictions includes a first set of N NER predictions $NER_11, \ldots, NER_1N$ for the first set of tokens and a second set of M NER predictions $NER_21, \ldots, NER_2M$ for the second set of tokens.

Specifically, a NER prediction for a respective token may indicate one or more likelihoods that the text unit (e.g., word) represented by the token or a phrase including the token belongs to one or more candidate entities (e.g., account, persons, address, product) or in the alternative, whether the token is not associated with any entity. For example, the NER prediction $NER_21$ for the word "Account" encoded by the first token $Tok_21$ may indicate a high likelihood (e.g., above 0.7) that the word does not belong to any type of entity. As another example, the NER prediction $NER_22$ for the word "ABC" encoded by the second token $Tok_22$ may indicate a high likelihood (e.g., above 0.7) that the word belongs to an account entity.

The match layer 230 is configured to receive the output embedding $OE_{CLS}$ for the [CLS] token and generate an entity matching prediction EM Pre that indicates whether the first input text and the second input text refer to the same entity. Depending on the training data used to train the entity matching model, the entity matching prediction may indicate whether the pair of input text describes the same account, address, persons, product, and the like. In the example shown in FIG. 2, since the two example input texts describe the same account entity (i.e., "ABC, Inc."), the entity matching prediction EM Pre will indicate a high likelihood that the pair describes the same account entity if the machine-learned entity matching model was trained to have relatively high accuracy.

Returning to the system environment 100 of FIG. 1, the matching system 140 trains the entity matching model using a combination of a first loss and a second loss during a training process that will be described in more detail below. In particular, while the set of NER predictions can be generated during the inference process, in one embodiment, the matching system 140 may only use the results of the entity matching predictions during the inference process for determining whether input taxes refer to the same entity. The NER prediction layer 235 as well as the process of generating NER predictions may be used during the training process to train parameters of the entity matching model.

The online system 110 is an organization, such as an enterprise, a government organization, a financial institution, an educational institution, and the like that use the computing resources of the cloud platform 130 to deploy one or more services or applications to users (e.g., customers) of the online system 110. For example, the online system 110A may be an enterprise with many subsidiaries, and the online system 110B may be a university. As discussed above in conjunction with the cloud platform 130, an online system 110 may deploy applications faster with less maintenance overhead and low upfront costs by using the computing resources of the cloud platform 130 compared to the instance where the online system 110 manages its own servers and infrastructure.

An online system 110, a subsidiary of an online system 110, or other organizational units of an online system 110 may be configured as a respective tenant in the multi-tenant architecture of the cloud platform 130. The online system 110 may store many types of records in databases of the cloud platform 130 that include information on various entities, procedures, and policies. Specifically, users of the online system 110 may store electronic records across many services and applications deployed by the online system 110, across multiple tenants within the cloud platform 130, and across different data models and modalities. Thus, electronic records of the online system 110 may store information on entities across multiple, disconnected databases using different formats and schema.

Alternatively, the online system 110 may represent a system within the cloud platform 130 itself. In other words, the cloud platform 130 may also span multiple subsidiaries or organizational units that also deploy many services and applications for customers of the cloud platform 130. Thus, the cloud platform 130 may also store different types of electronic records related to entities (e.g., customer account entities, vendor entities, etc.). While the system environment 100 shown in FIG. 1 includes online systems 110A, 110B as examples, this is merely for illustration and it is appreciated that in other embodiments, the online system 110 may be individual users, non-organizational entities, or the like who can use client devices to interact with the cloud platform 130.

In one embodiment, the online system 110 may request or authorize the matching system 140 of the cloud platform 130 to perform an entity matching process, in which the matching system 140 obtains electronic records of the online system 110, identifies redundant or duplicate input texts that describe the same entities, and merge the identified records together to create a merged record for the online system 110. Thus, unnecessary redundancies in the electronic records of the online system 110 can be reduced, and users of the online system 110 may view the merged record obtain a more comprehensive view of entity information.

The network 120 provides a communication infrastructure between the cloud platform 130 (as well as the matching system 140) and the online systems 110. The network 120 is typically the Internet, but may be any network, including but not limited to a Local Area Network (LAN), a Metropolitan Area Network (MAN), a Wide Area Network (WAN), a mobile wired or wireless network, a private network, or a virtual private network.

Matching System

Figure 3:
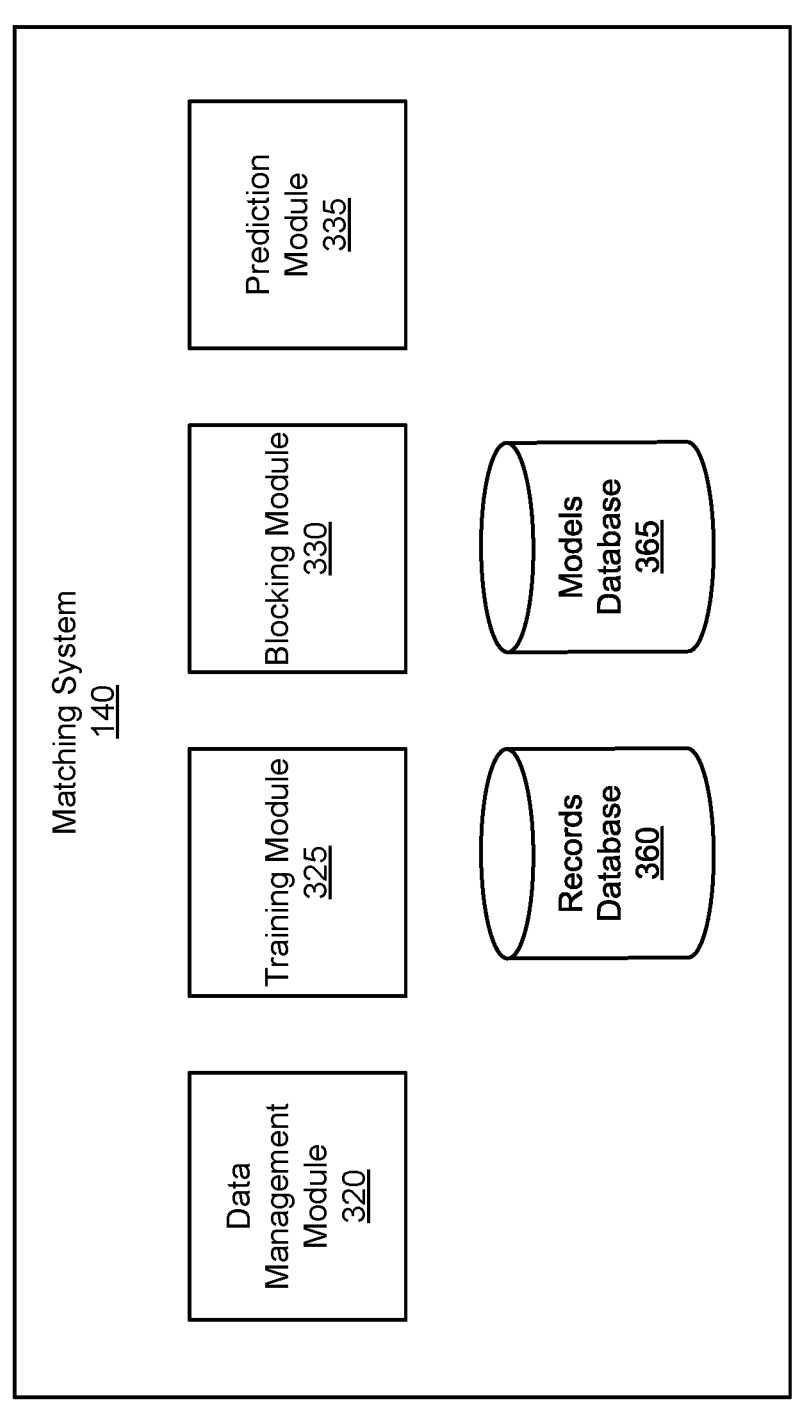
FIG. 3 is a block diagram of an architecture of a matching system in the cloud platform, in accordance with an embodiment.

FIG. 3 is a block diagram of an architecture of a matching system 140 in the cloud platform 130, in accordance with an embodiment. The matching system 140 comprises modules including a data management module 320, a training module 325, a blocking module 330, and a prediction module 335. The matching system 140 includes a records database 360 and a models database 365. Some embodiments can have different modules than those described here. Similarly, the functions described among the modules can be distributed in a different manner than is described here.

The records database 360 includes electronic records of online systems 110. The electronic records in the records database 360 may be organized with respect to different online systems 110, subsidiaries of online systems 110, or organizational units of online systems 110. The records database 360 includes different modalities of data including structured data and unstructured data. The structured data may be categorized and organized data and may include database structures such as SQL databases. The unstructured data may be data that is not categorized or organized in a manner like structured data but may include any form of textual data such as text from web pages, social networking service (SNS) website posts, text documents, blog posts, news and magazine articles, and the like.

The data management module 320 generates and manages training data for training one or more entity matching models. In one embodiment, the data management module 320 processes electronic records from the records database 360 into one or more processing units, for example, sentences, paragraphs, phrases, etc. In one embodiment, the data management module 320 may identify pairs (or more) of input texts, where the input texts describe or refer to the same entity or do not. In one instance, the data management module 320 identifies pairs of input texts that refer (or do not refer) to the same account. However, in other instances, the data management module 320 may identify pairs of input texts that refer to different types of entities, such as person, address, product, and the like.

The training data may include a plurality of training instances. A training instance includes a series of tokens, where each token numerically represents a respective text unit (e.g., word) of the input text. The series of tokens for a training instance may thus include a first series of tokens for a first input text in the pair and a second series of tokens for a second input text in the pair. In one instance, a token for a respective word is represented by a dense vector including a plurality of elements each with a respective value. The dimensionality of the vector may be 768 or any number. In another instance, a token for a respective word is represented by a one-hot encoded vector that includes a plurality of elements each corresponding to a word. The element corresponding to the respective word is set to a non-zero value (e.g., 1) and the remaining words are set to zero in the one-hot encoded vector.

The training instance also includes an entity matching label indicating whether the first input text and the second input text refer to a same entity. In one instance, the entity matching label is 1 if the pair of input texts refer to the same entity and 0 if not. The training instance also includes a set of NER labels. The set of NER labels includes a NER label for each token in the series of tokens for the training instance. A NER label for a respective token may indicate a type of entity (e.g., account, city of address, person, product) for the word represented by the token. In one instance, an NER label for a respective token is encoded using a "beginning, inside and outside" (BIO) encoding scheme in which the respective token is assigned to either the beginning of a named entity, an inside of the named entity, or outside of a named entity (i.e., not belonging to named entity). For example, in the address entity "234 West Drive," the NER label for "234" may be assigned B-ADD (beginning of address), "West" may be assigned I-ADD (inside of address), and "Drive" may be assigned I-ADD (inside of address). A token that does not belong to any named entity may be assigned O (outside of any entity).

In one embodiment, the data management module 320 may also perform additional processing steps to convert structured data into input text that can be processed by the entity matching model. In particular, many natural language processing (NLP) models, such as transformer architectures, process input texts (i.e., sentences, paragraphs, phrases) and learns contextual representations of tokens. In contrast, a structured database may include entity information, such as the name of the account entity, address associated with the account, contact persons associated with the account in a categorized and organized manner such as a table include columns. Thus, in one embodiment, the data management module 320 constructs one or more template sentences to convert entity data in a structured format into input text. The data management module 320 may insert information on the entity into the templates to generate a respective input text for a training instance.

For example, when the entity matching model generates likelihoods that a pair of input texts refer to a same account entity, an example template sentence may be "Account <Account Name> operates in <Industry>. It is located at <Address>, and has contacts <Contact 1 Name>, <Contact 2 Name>," where the fields <Account Name>, <Address>, <Contact 1 Name>, and <Contact 2 Name> can be populated from the structured database. Specifically, in addition to the actual name of the account entity, entities and fields related to the account entity can also provide further contextual information and inform the entity matching model on the entities being compared. As another example, when the entity matching model generates likelihoods that a pair of input texts refer to a same contact entity, an example sentence may be "<Contact Name> works for <Account Name>, has phone number <Phone>, email <Email> and collaborates with <Contact 1>, <Contact 2>," where the fields <Contact Name>, <Account Name>, <Phone>, <Email>, <Contact 1>, and <Contact 2> can be populated from the structured database.

By formulating sentences (or other types of text units) that can be input to the entity matching model, the data management module 320 can construct a training instance with information from both unstructured and structured data. For example, a training instance may include a first input text obtained from a text document describing an account entity and a second input text obtained from a SQL database describing the same account entity in a structured format. In this manner, the data management module 320 can take advantage of entity data in various structured and unstructured data. Moreover, for structured data, the data management module 320 can formulate sentences or paragraphs using templates that provide additional contextual information the entity matching model can learn from to determine entities.

The training module 325 trains one or more entity matching models that are each configured to generate entity matching predictions indicating likelihoods whether a pair of input texts refer to the same entity. The training process is described in conjunction with FIG. 4, which illustrates a training process of the entity matching model, in accordance with an embodiment. The entity matching model is substantially similar to the architecture shown in FIG. 2, except that the parameters of the entity matching model of FIG. 4 have not been completely determined as the parameters are being trained during, for example, an iteration of a training process.

Figure 4:
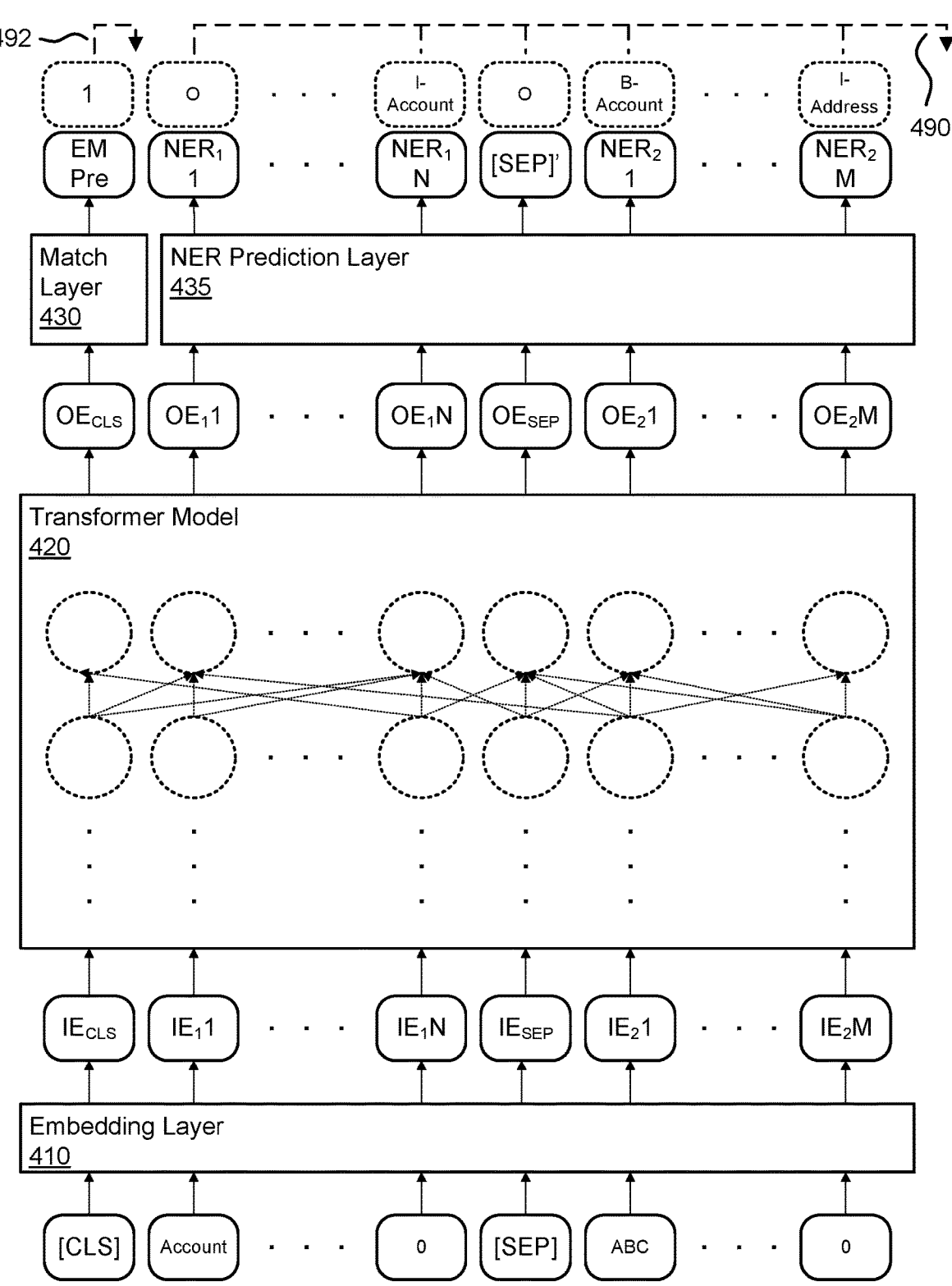
FIG. 4 illustrates a training process of the entity matching model, in accordance with an embodiment.

In one embodiment the training module 325 obtains a set of training instances from, for example, the training data generated by the data management module 320. The training module 325 generates a series of tokens for the training instance from the first input text and the second input text. As shown in FIG. 4, for a given training instance, the training module 325 generates a series of tokens including a classification token, a first set of tokens for the first input text, a separation token, and a second set of tokens for the second input text. Any extra tokens in the first set of tokens that go beyond the length of the first input text are masked to zero and any extra tokens in the second set of tokens that go beyond the length of the second input text are masked to zero such that the tokens do not contribute to the backpropagation step.

In one embodiment, the training module 325 trains the entity matching model by repeatedly iterating between a forward pass step and a backpropagation step to reduce a loss function. During the forward pass step, the training module 325 generates a set of input embeddings including an input embedding $IE_{CLS}$ for the classification token, a first set of input embeddings $IE_1 1, \ldots, IE_1 N$ for the first input text, an input embedding $IE_{SEP}$ for the separation token, and a second set of input embeddings $IE_2 1, \ldots, IE_2 M$ for the second input text by applying parameters of the embedding layer 410 to the series of tokens for a training instance.

The training module 325 generates a set of output embeddings by applying parameters of the transformer model 420 to the set of input embeddings. The transformer model 420 may include a set of encoders or decoders to the set of input embeddings. In particular, the set of output embeddings may include an output embedding $OE_{CLS}$ for the classification token, a first set of output embeddings $OE_1 1, \ldots, OE_1 N$ for the first input text, an output embedding $OE_{SEP}$ for the separation token, and a second set of output embeddings $OE_2 1, \ldots, OE_2 M$ for the second input text for the training instance.

The training module 325 generates a set of estimated NER predictions by applying parameters of the NER prediction layer 435 to the set of output embeddings. The set of estimated NER predictions may include NER predictions $NER_1 1, \ldots, NER_1 N$ for tokens in the first input text and NER predictions $NER_2 1, \ldots, NER_2 M$ for tokens in the second input text. The training module 325 also generates an estimated entity matching prediction by applying the parameters of the match layer 430 to the output embedding $OE_{CLE}$ for the classification token [CLE]. In one instance, the match layer 430 is a binary classifier consisting of a linear neural network layer which can be trained using cross-entropy loss. The forward pass may be performed for a batch of training instances.

The training module 325 determines a loss function including a NER loss 490 and an entity matching loss 492. The NER loss 490 indicates a difference between the set of NER predictions and the corresponding NER labels for the training instance. In the example shown in FIG. 4, the NER labels for the training instance include O, . . . , I-Account, O, B-Account, . . . , I-Address. The difference may be computed as a cross-entropy loss and the like. In one instance, the NER loss is given by:

$$NER \ loss = \sum_{i=1}^{n}\sum_{j=1}^{m}\sum_{k=1}^{c} y_{ijk}\log(p_{ijk})$$

where n is the total number of training instances in the batch, m is the maximum number of tokens allowed in the input text, c is the number of different NER labels (i.e., number of different NER categories), $y_{ijk}$ is the NER label for a particular entity type k for a particular token j for a particular training instance i, and $p_{ijk}$ is the estimated NER prediction.

The entity matching loss 492 indicates a difference between the estimated entity matching prediction and the corresponding entity matching label for the training instance. In the example of FIG. 4, the entity matching label for the training instance is a 1, indicating that the first input text and the second input text of the training instance refers to the same entity. The difference may be computed as a cross-entropy loss, and the like. In one instance, the entity matching loss is given by:

$$Entity \ matching \ loss = \sum_{i=1}^{n} y_i\log(p_i)$$

where $y_i$ is the entity matching label for a particular training instance i and $p_i$ is the estimated entity matching prediction.

The final loss is given by the weighted sum of the NER loss 490 and the entity matching loss 492 with weights $\alpha$ and $\beta$ chosen so that both loss components are of similar scale.

$$Combined \ loss = \alpha\sum_{i=1}^{n}\sum_{j=1}^{m}\sum_{k=1}^{c} y_{ijk}\log(p_{ijk}) + \beta\sum_{i=1}^{n} y_i\log(p_i).$$

During the backpropagation step, the training module 325 updates the set of parameters of the entity matching model by backpropagating error terms from the loss function. For example, parameters of the embedding layer 410, the transformer model 420, the NER prediction layer 435, and the match layer 430 may be updated based on error terms that are one or more derivatives of the loss function. The forward pass step and the backpropagation step may be repeated for multiple batches of training data until a convergence criterion for the parameters is reached (e.g., change between iterations is less than a predetermined threshold). The trained entity matching model is stored in the model database 365.

In one embodiment, the training module 325 trains the entity matching model based on a pretrained NER model configured to receive a set of tokens and output a set of NER predictions on the set of tokens. Thus, the entity matching model may already be configured to generate NER predictions on categories of entities such as persons, organizations, locations, monetary values, percentages, and the like, but may not be configured to predict entity categories that are particular to an organization. Thus, in one embodiment, the training module 325 performs a finetuning process on the pretrained NER model to incorporate additional categories of entities that are particular to one or more organizations such that the entity matching model is configured to generate NER predictions for those entity categories. As an example, the additional NER categories may include account name, product name, and the like.

For example, the training module 325 may obtain training data including a set of tokens and corresponding NER labels that are encoded to include the additional NER categories. The training module 325 may repeatedly perform a forward pass step and a backpropagation step. Specifically, during the forward pass step, the training module 325 generates a set of estimated NER predictions by applying the entity matching model to the set of tokens. The training module 325 determines a NER loss indicating a difference between the set of estimated NER predictions and the corresponding NER labels. The training module 325 backpropagates error terms obtained from the NER loss to update parameters of the entity matching model. This process is repeated until a convergence criterion is reached.

Subsequently, the training module 325 further trains the entity matching model to generate entity matching predictions based on the training process described in conjunction with FIG. 4. By training the entity matching model based on a pretrained NER prediction model, the data management module 320 does not have to separately obtain training data for NER categories that the pretrained NER prediction model is already configured to predict. Therefore, computational resources as well as human annotation resources for labeling and collecting the training data can be saved.

The blocking module 325 performs a blocking process on the electronic records before pairs of input texts are input to the entity matching model. Often times, it is computationally infeasible to perform a pairwise comparison of all processing units of text. Thus, the blocking process reduces the pairs to match by applying a set of rules and heuristics to identify blocks of records. In one instance, the set of rules and heuristics for identifying input texts for each block include comparing all contacts in the same pincode and sharing at least the name initials, account names that are capped by a maximum edit distance (i.e., account names that are below a maximum edit distance), input texts that share at least a minimum percent of n-grams, and the like. The block module 325 ensures that the input texts in each block are significantly fewer than the total number input texts for entity matching and have passed basic checks to discard input texts that do not describe the same entity for the block.

The prediction module 335 identifies pairs of input texts describing the same entity by applying the trained entity matching model to the input texts. For each block, the prediction module 335 inputs pairs of input text of the block to the trained entity matching model to generate entity matching predictions for the pair. The prediction module 335 determines select pairs of input text that have entity matching predictions above a predetermined threshold that indicate the pair of input texts likely contain information on the same entity. A human operator can additionally verify the prediction. In one instance, the prediction module 335 merges the information in the selected pairs of input text such that the information in the different electronic records of the same entity are included in the same record.

Method of Training Entity Matching Model

FIG. 5 is a flowchart illustrating a method of training an entity matching model, in accordance with an embodiment. In one embodiment, the process of FIG. 5 is performed by various modules of the cloud platform 130, specifically the matching system 140. Other entities may perform some or all of the steps of the process in other embodiments. Likewise, embodiments may include different and/or additional steps, or perform the steps in different orders.

The matching system 140 obtains 502 a set of training instances. A training instance may include a series of tokens with a first series of tokens for a first input text and a second series of tokens for a second input text, an entity matching label indicating whether the first input text and the second input text refer to a same entity, and a set of named entity recognition (NER) labels indicating types of entities for the series of tokens.

For a training instance, the matching system 140 generates 504 a set of output embeddings by applying a set of encoders to the series of tokens. The set of output embeddings may include an output embedding for a classification token and a first series of output embeddings for the first series of tokens and a second series of output embeddings for the second series of tokens.

The matching system 140 generates 506 a set of NER predictions for the series of tokens by applying a NER prediction layer to the first series of output embeddings and the second series of output embeddings. The matching system 140 also generates 508 an entity matching prediction by applying a match layer to the output embeddings for the classification token.

The matching system 140 determines 510 a loss function including a NER loss and an entity matching loss. The NER loss indicates a difference between the set of NER predications and the corresponding NER labels for the training instance, and the entity matching loss indicating a difference between the entity matching prediction and the entity matching label for the training instance. The matching system 140 backpropagates 512 error terms obtained from the loss function to update parameters of the match layer, the NER prediction layer, and the set of encoders.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method, comprising:
obtaining a set of training instances, a training instance including a series of tokens with a first series of tokens for a first input text obtained from a first electronic record of a cloud platform storing different types of electronic records related to a plurality of entities and a second series of tokens for a second input text obtained from a second electronic record of the cloud platform, an entity matching label indicating whether the first input text and the second input text refer to a same entity distinct from other ones of the plurality of entities, and a set of named entity recognition (NER) labels indicating a type of entity for a respective token of the series of tokens among a first set of entity categories, wherein the first electronic record is different from the second electronic record;
for a training instance, generating a set of output embeddings by applying a set of encoders to the series of tokens, the set of output embeddings including an output embedding for a classification token and a first series of output embeddings for the first series of tokens and a second series of output embeddings for the second series of tokens;
generating a set of NER predictions of the type of entity among the first set of entity categories for respective tokens of the series of tokens by applying a NER prediction layer to the first series of output embeddings and the second series of output embeddings;
generating an entity matching prediction indicating whether the first input text and the second input text refer to the same entity by applying a match layer to the output embeddings for the classification token;
determining a loss function including a NER loss and an entity matching loss, the NER loss indicating a first difference between the set of NER predictions and the corresponding NER labels for the training instance, and the entity matching loss indicating a second difference between the entity matching prediction and the entity matching label for the training instance; and
backpropagating error terms obtained from the loss function to update parameters of the match layer, the NER prediction layer, and the set of encoders.

2. The computer-implemented method of claim 1, wherein the cloud platform comprises a structured database comprising the electronic records related to the plurality of entities and obtaining the set of training instances comprises:
for a training instance, obtaining information from the structured database about an entity of the plurality of entities, and
generating an input text from the information by inserting values for data fields in the structured database into data fields in a template.

3. The computer-implemented method of claim 1, wherein the entity matching label for a training instance indicates whether the same entity refers to at least one of a same account entity, a same contact person entity, a same address entity, or a same product entity.

4. The computer-implemented method of claim 1, wherein the set of encoders are configured as a transformer architecture that includes one or more attention layers.

5. The computer-implemented method of claim 4, wherein the set of encoders are configured as a bidirectional encoder representations from transformers (BERT) model.

6. The computer-implemented method of claim 1, wherein the set of encoders, the NER prediction layer, and the match layer are configured as a neural network.

7. The method of claim 1, wherein the loss function comprises a weighted sum of the NER loss and the entity matching loss.

8. The method of claim 1, further comprising performing a blocking process on the electronic records before obtaining the first input text from the first electronic record and the second input text from the second electronic record.

9. The method of claim 8, wherein the first input text and the second input text share at least a minimum percent of n-grams.

10. A non-transitory computer-readable storage medium storing computer program instructions executable to perform operations, the operations comprising:
obtaining a set of training instances, a training instance including a series of tokens with a first series of tokens for a first input text obtained from a first electronic record of a cloud platform storing different types of electronic records related to a plurality of entities and a second series of tokens for a second input text obtained from a second electronic record of the cloud platform, an entity matching label indicating whether the first input text and the second input text refer to a same entity distinct from other ones of the plurality of entities, and a set of named entity recognition (NER) labels indicating a type of entity for a respective token of the series of tokens among a first set of entity categories, wherein the first electronic record is different from the second electronic record;

for a training instance, generating a set of output embeddings by applying a set of encoders to the series of tokens, the set of output embeddings including an output embedding for a classification token and a first series of output embeddings for the first series of tokens and a second series of output embeddings for the second series of tokens;

generating a set of NER predictions of the type of entity among the first set of entity categories for respective tokens of the series of tokens by applying a NER prediction layer to the first series of output embeddings and the second series of output embeddings;

generating an entity matching prediction indicating whether the first input text and the second input text refer to the same entity by applying a match layer to the output embeddings for the classification token;

determining a loss function including a NER loss and an entity matching loss, the NER loss indicating a first difference between the set of NER predictions and the corresponding NER labels for the training instance, and the entity matching loss indicating a second difference between the entity matching prediction and the entity matching label for the training instance; and backpropagating error terms obtained from the loss function to update parameters of the match layer, the NER prediction layer, and the set of encoders.

11. The non-transitory computer-readable storage medium of claim 10, the cloud platform comprising a structured database comprising the electronic records related to the plurality of entities, the instructions further comprising:

for a training instance, obtaining information from the structured database about an entity of the plurality of entities, and generating an input text from the information by inserting values for data fields in the structured database into data fields in a template.

12. The non-transitory computer-readable storage medium of claim 10, wherein the entity matching label for a training instance indicates whether the same entity refers to at least one of a same account entity, a same contact person entity, a same address entity, or a same product entity.

13. The non-transitory computer-readable storage medium of claim 10, wherein the set of encoders are configured as a transformer architecture that includes one or more attention layers.

14. The non-transitory computer-readable storage medium of claim 13, wherein the set of encoders are configured as a bidirectional encoder representations from transformers (BERT) model.

15. The non-transitory computer-readable storage medium of claim 10, wherein the set of encoders, the NER prediction layer, and the match layer are configured as a neural network.

16. A system comprising:

a processor; and a computer-readable medium comprising instructions executable on the processor for:

obtaining a set of training instances, a training instance including a series of tokens with a first series of tokens for a first input text obtained from a first electronic record of a cloud platform storing different types of electronic records related to a plurality of entities and a second series of tokens for a second input text obtained from a second electronic record of the cloud platform, an entity matching label indicating whether the first input text and the second input text refer to a same entity distinct from other ones of the plurality of entities, and a set of named entity recognition (NER) labels indicating a type of entity for a respective token of the series of tokens among a first set of entity categories, wherein the first electronic record is different from the second electronic record;

for a training instance, generating a set of output embeddings by applying a set of encoders to the series of tokens, the set of output embeddings including an output embedding for a classification token and a first series of output embeddings for the first series of tokens and a second series of output embeddings for the second series of tokens;

generating a set of NER predictions of the type of entity among the first set of entity categories for respective tokens of the series of tokens by applying a NER prediction layer to the first series of output embeddings and the second series of output embeddings;

generating an entity matching prediction indicating whether the first input text and the second input text refer to the same entity by applying a match layer to the output embeddings for the classification token;

determining a loss function including a NER loss and an entity matching loss, the NER loss indicating a first difference between the set of NER predictions and the corresponding NER labels for the training instance, and the entity matching loss indicating a second difference between the entity matching prediction and the entity matching label for the training instance; and backpropagating error terms obtained from the loss function to update parameters of the match layer, the NER prediction layer, and the set of encoders.

17. The system of claim 16, the cloud platform comprising a structured database comprising the electronic records related to the plurality of entities, the instructions further comprising:

for a training instance, obtaining information from the structured database about an entity of the plurality of entities, and generating an input text from the information by inserting values for data fields in the structured database into data fields in a template.

18. The system of claim 16, wherein the entity matching label for a training instance indicates whether the same entity refers to at least one of a same account entity, a same contact person entity, a same address entity, or a same product entity.

* * * * *